(12) United States Patent
Ferguson

(10) Patent No.: US 9,469,179 A0
(45) Date of Patent: Oct. 18, 2016

(54) SUNGLASSES CONFIGURATION CAR VISOR

(76) Inventor: Darrian L. Ferguson, Chula Vista, CA (US)

( * ) Notice: Subject to any disclaimer, the term of this patent is extended or adjusted under 35 U.S.C. 154(b) by 37 days.

(21) Appl. No.: 10/998,996

(22) Filed: Nov. 30, 2004

(65) Prior Publication Data

US 2006/0113818 A1    Jun. 1, 2006

(51) Int. Cl.
*B60J 3/00* (2006.01)
*B60J 3/02* (2006.01)

(52) U.S. Cl.
CPC .................................. *B60J 3/0208* (2013.01)

(58) Field of Classification Search
USPC ........ 296/97.6, 97.1, 97.2, 97.5, 97.9, 97.12
See application file for complete search history.

(56) References Cited

U.S. PATENT DOCUMENTS

| | | | | |
|---|---|---|---|---|
| 2,097,419 A | * | 10/1937 | Schmidt | 359/602 |
| 2,100,243 A | * | 11/1937 | Doody | 296/97.6 |
| 2,244,959 A | * | 6/1941 | Seizo | 296/97.6 |
| 2,458,125 A | | 1/1949 | Winkler | |
| 2,622,922 A | * | 12/1952 | Schroeder | 296/97.6 |
| 2,681,824 A | | 6/1954 | Knoblock | |
| 2,747,927 A | | 5/1956 | Burkhead | |
| 2,931,114 A | * | 4/1960 | Peterson | 40/644 |
| 3,462,867 A | * | 8/1969 | Elder et al. | 40/517 |
| 3,494,689 A | * | 2/1970 | McGlinchy | 359/844 |
| 3,692,355 A | * | 9/1972 | Hong | 296/97.2 |
| 3,695,658 A | * | 10/1972 | Vacha | 296/97.6 |
| 4,034,910 A | * | 7/1977 | Rogers | 229/68.1 |
| 4,053,180 A | * | 10/1977 | White | 296/97.6 |
| 4,055,012 A | * | 10/1977 | Cote | 40/611.06 |
| 4,090,732 A | | 5/1978 | Vistitsky | |
| 4,352,519 A | | 10/1982 | Aro | |
| D310,195 S | | 8/1990 | Ruimi | |
| D312,608 S | | 12/1990 | Wong, Jr. et al. | |
| 4,979,775 A | | 12/1990 | Klose | |
| 5,044,685 A | | 9/1991 | Yang | |
| 5,076,633 A | | 12/1991 | Hsu et al. | |
| 5,213,389 A | * | 5/1993 | Loftis et al. | 296/97.7 |
| D344,530 S | | 2/1994 | Johnson | |

(Continued)

FOREIGN PATENT DOCUMENTS

| | | |
|---|---|---|
| DE | 4023377 | 1/1992 |
| DE | 4323502 | 1/1995 |
| JP | 3-239629 | 10/1991 |

OTHER PUBLICATIONS

"Ciaobellababy.com" Website, printed Sep. 28, 2004, White Hot® Safety Sunblock Shade From Munchkin.

*Primary Examiner* — H. Gutman
(74) *Attorney, Agent, or Firm* — Erik Vieira

(57) ABSTRACT

The sunglasses configuration car visor is formed of a closed, completely surrounding frame having a translucent lens or panel removably installed therein. The device may be provided as a pair of mirror image units for removable attachment to the conventional opaque left/right sun visors in a motor vehicle. When deployed, such a pair of translucent, shaded lenses or panels has the appearance of a pair of sunglasses disposed immediately inside the vehicle windshield. The frames have visor attachment clips extending therefrom, with the clips pivotally attached to the frame of the device. This allows the visors to be deployed or retracted independently of the permanently installed opaque visor in the vehicle. The interchangeability of various lenses or panels allows the user to switch to lenses of different gradients depending upon conditions, and/or to display a scene, message, etc. on a partially silvered lens or panel.

7 Claims, 6 Drawing Sheets

(56) References Cited

U.S. PATENT DOCUMENTS

| | | |
|---|---|---|
| 5,356,192 A | 10/1994 | Schierau |
| D352,261 S | 11/1994 | Shink |
| D353,569 S | 12/1994 | Ferguson |
| D356,286 S | 3/1995 | Shink |
| D365,076 S | 12/1995 | Ferguson |
| D370,449 S | 6/1996 | Wang |
| 5,673,957 A | 10/1997 | Moo et al. |
| 5,947,544 A | 9/1999 | Hubeshi |
| 5,954,386 A | 9/1999 | Thomas |
| D427,959 S | 7/2000 | Aguillar |
| 6,371,546 B1 | 4/2002 | Jefferson |
| 6,402,221 B1 | 6/2002 | Ogunjobi |
| 6,412,850 B1 * | 7/2002 | Francis et al. ............... 296/97.6 |
| D475,005 S | 5/2003 | Grijalva |
| 6,860,047 B1 * | 3/2005 | Rodriguez ..................... 40/591 |

* cited by examiner

SUNGLASSES CONFIGURATION CAR VISOR

BACKGROUND OF THE INVENTION

1. Field of the Invention

The present invention relates generally to car visors and attachments to car visors. More specifically, the sunglasses configuration car visor is a sun shade that is configured to have the appearance of sunglasses and that attaches to a conventional vehicle sun visor and is used in lieu thereof.

2. Description of the Related Art

Both sun glare in daylight and headlight glare at night can be extremely hazardous to motorists. All automobiles are equipped with sun visors, but these original equipment components are universally formed of opaque materials. While they may be pivoted upwardly out of the driver's line of sight, they do nothing to reduce glare when in their retracted state. When lowered, conventional opaque visors not only block the glare, but also the driver's or passenger's field of view. While existing opaque sun visors can be of assistance in reducing glare, their "all or nothing" operation is less than optimal.

Various attempts have been made to improve car visors. Examples of such attempts include Japanese Patent No. 3-239,629, published on Oct. 25, 1992, describing (according to the drawings and English abstract) a permanently installed, opaque panel (the abstract calls this panel a "blind"), which extends from a slot or receptacle within a specially configured opaque sun visor. A similar mechanism is described (again, according to the drawings and English abstract) in German Patent No. 4,023,377, published on Jan. 30, 1992, having a flexible panel extending from a hollow receptacle within a specially configured opaque visor. The panel is frictionally held in position by being flexibly gripped between adjacent rollers. Still another example is found in German Patent No. 4,323,502, published on Jan. 19, 1995. The '502 German Patent describes (according to the drawings and English abstract) various embodiments of a visor extension contained within a hollow receptacle within a specially constructed sun visor. The device may comprise a series of interlinked panels, a roller blind (apparently opaque), or an accordion folded device.

None of the above inventions and patents, taken either singly or in combination, is seen to describe the instant invention as claimed. Thus a sunglasses configuration car visor solving the aforementioned problems is desired.

SUMMARY OF THE INVENTION

The sunglasses configuration car visor comprises various embodiments of a completely encircling frame having various compatibly shaped translucent panels or lenses, which may be interchangeably installed within the frame. The device may be provided in a pair of mirror image units for removable placement upon the existing opaque visors in a motor vehicle. When deployed, such mirror image units take on the appearance of a large pair of sunglasses disposed immediately inside the windshield of the vehicle. The function of the present visor is somewhat akin to that of sunglasses as well, i.e., to reduce glare without obstructing the view. Clips are provided to allow removable attachment to the existing opaque sun visors in the vehicle. A hinge or pivot mechanism between the clips and the frame allows each frame and its lens or panel to be pivoted out of view or into the visual path without requiring the lowering of the conventional visor. The device may be operated independently of the existing sun visor, depending upon how it is attached to the existing visor.

The device is configured to allow the lenses or translucent panels to be removed and replaced within their respective frames. This allows the user to exchange the lenses or panels as desired for different conditions, e.g., a darker gradient for driving in snow country on a clear day, an amber tint for fog and haze, different polarities, etc. The translucent panels may also be partially coated with a pattern or design visible upon the outwardly facing surface.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The sunglasses configuration car visor comprises removable attachment to the primary sun visor in a motor vehicle. The device may be used in pairs, with each side being a mirror image of the other in order to resemble a pair of sunglasses disposed within the windshield of the automobile when deployed.

Figure 1:
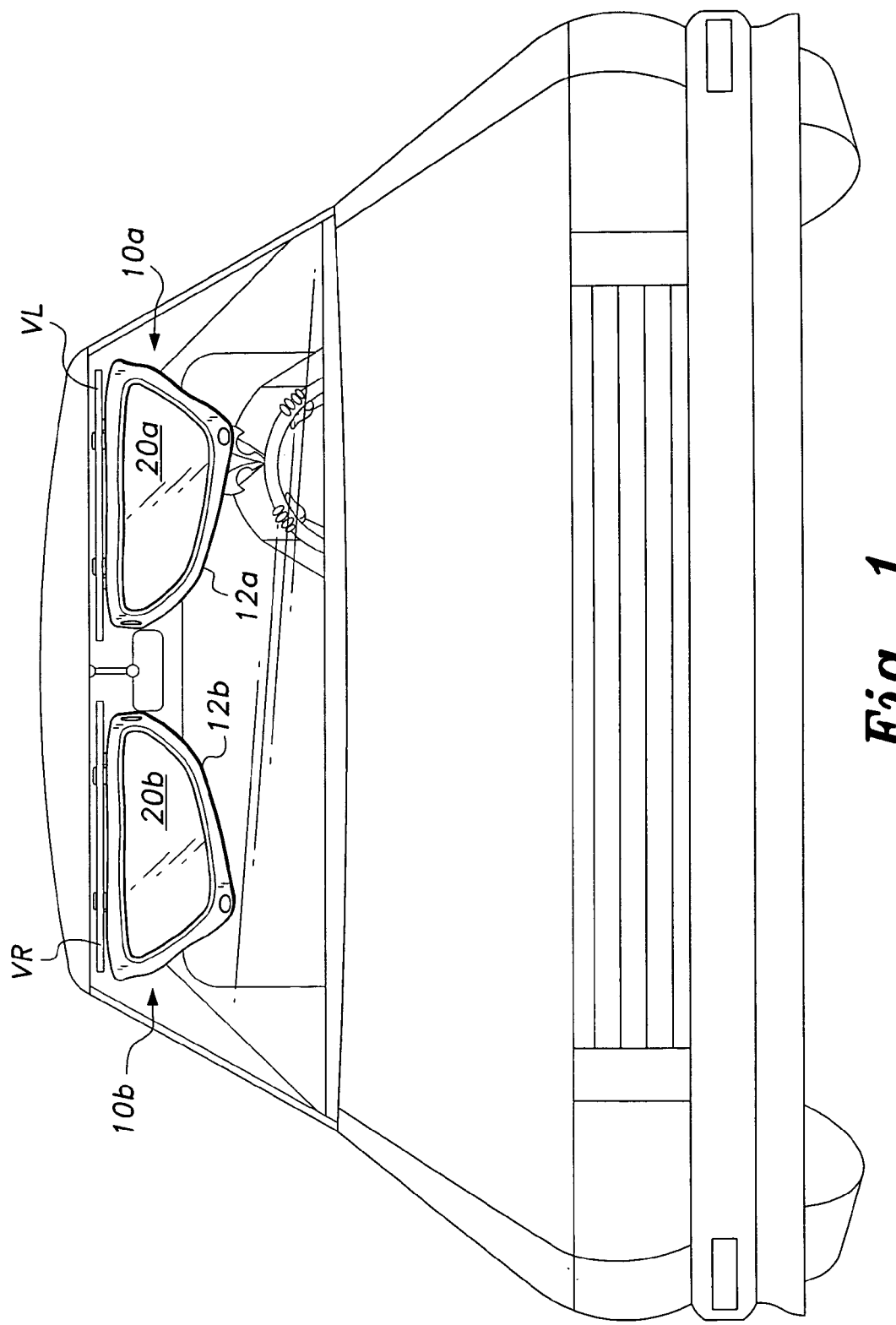
FIG. 1 is an environmental, perspective view of a sunglasses configuration car visor pair according to the present invention, deployed from the conventional opaque sun visors in an automobile.
Figure 2:
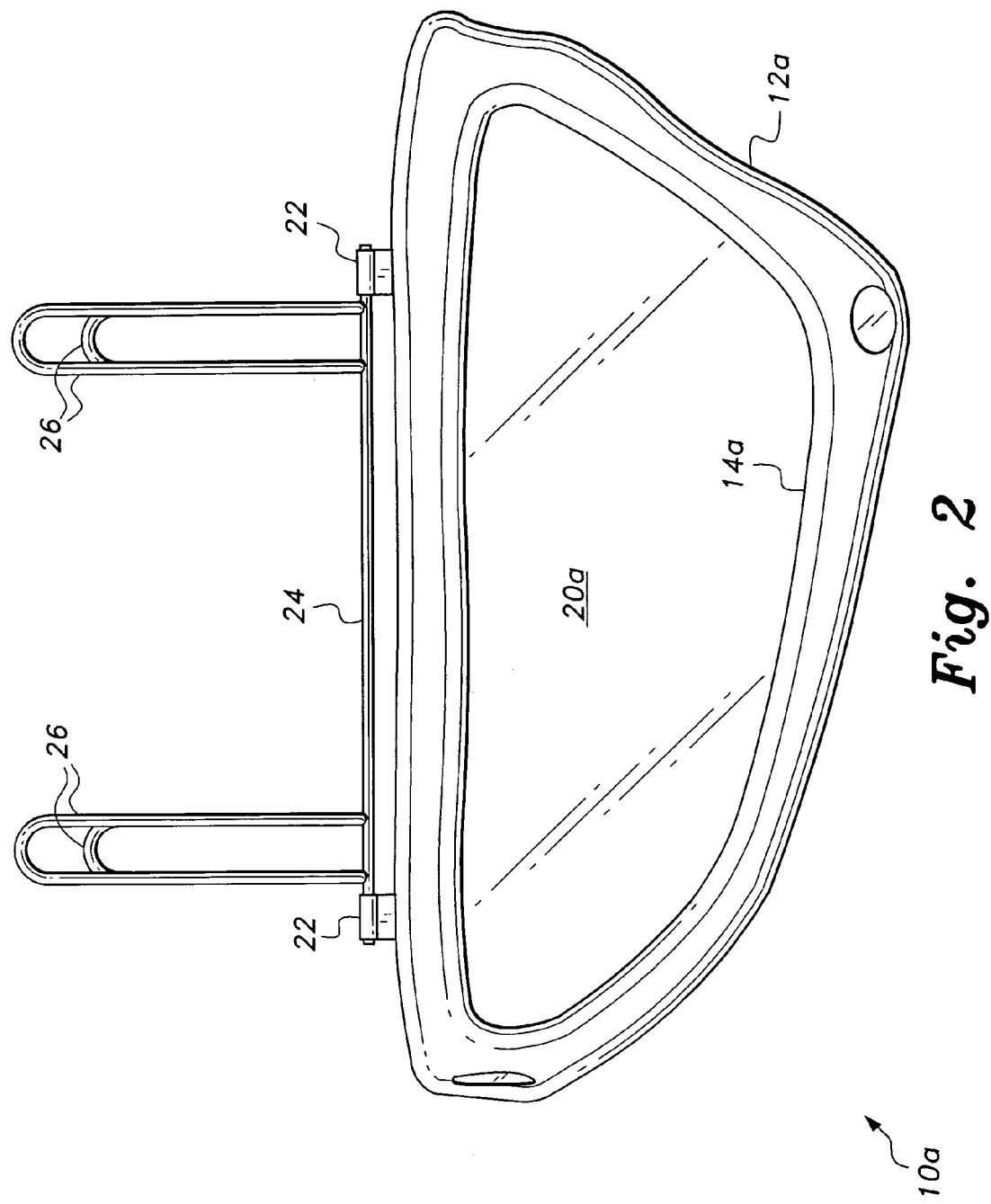
FIG. 2 is a front elevation view of a first embodiment of a single panel of the present sunglasses configuration visor, showing various details thereof.
Figure 3:
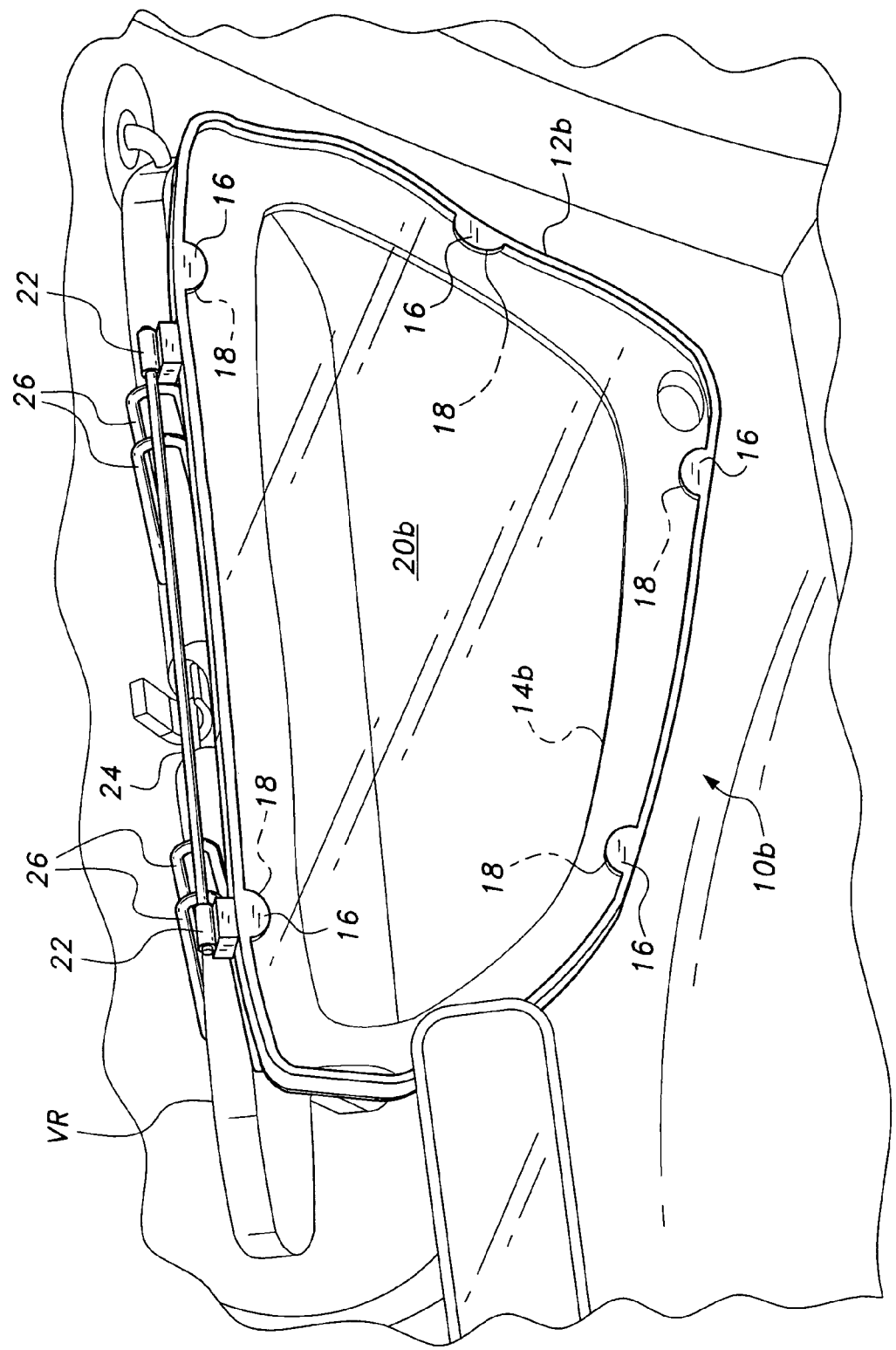
FIG. 3 is an environmental perspective view of a first embodiment visor panel, showing its installation and deployment on a conventional opaque vehicle sun visor.

FIGS. 1 through 3 illustrate the general configuration and operation of a first embodiment of the sunglasses configuration car visor, designated by the reference numeral 10*a* (for the left side, as viewed from within the vehicle) and 10*b* (for the right side). Visors 10*a* and 10*b* each include a continuous, closed frame 12*a*, 12*b* having a continuous, forwardly disposed peripheral lens panel retaining flange 14*a* (FIG. 2) and 14*b* (FIG. 3) therearound. The opposite rearward portions of the frames each include a plurality of panel retaining clips 16 disposed therearound, with the forward panel retaining flanges 14*a*, 14*b* and their respective clips 16 defining a lens panel retaining channel 18 (FIG. 3) therebetween. Alternatively, the clips 16 could be formed as a continuous flange to form a continuous channel, if the lens panel(s) and frame are formed of materials having sufficient flexibility.

Each visor 10*a* and 10*b* may include at least one translucent or transparent lens panel, respectively 20*a* and 20*b*, removably installed therein. The lens panels 20*a* and 20*b* are shaped or configured to be closely congruent with the channels 18 of their respective frames 12a and 12b. It will be seen that while a limited number of different frame and lens panel configurations are illustrated in the drawings, there is no practicable limit to the different frame and lens shapes and configurations which may be used to form the present supplementary visors. The frames and lenses may be inwardly tapered, as shown in FIGS. 1 through 3, or circular, oval, generally squared with rounded or squared corners, and/or may include additional elements, as desired.

The lens panels 20a and 20b do not include any refractive correction, but are formed as optically flat units in order to avoid visual distortion when the devices are deployed. However, they may include various different optical properties, such as different color tints, different densities or gradients, different degrees of polarization, etc. For example, a user of the visors 10a and 10b may be traveling from late afternoon into darkness, and may stop to exchange a relatively dark gradient lens for use in bright sunlight for a clear, polarized lens to reduce headlight glare. The lens panels 20a and 20b are quickly and easily interchanged in their frames 12a and 12b merely by flexing the flexible plastic lens material and/or frame or clip material as required to release the lens panels from their respective frames, and snapping a different pair of lens panels in place in the frames.

The visors 10a and 10b are removably attached to the respective left and right side visors VL and VR by a clip structure. The attachment clip mechanism is essentially the same for each visor 10a and 10b, and comprises a pair of opposed hinge leaves 22 extending from the attachment edge of each frame 12a and 12b. A pivot rod (formed by a lateral hinge pin or pintle) 24 extends between the two leaves 22 of each attachment assembly, with a pair of visor clips 26 extending from the pivot rod 24. The visor clips 26 each comprise a pair of generally parallel members that pass to each side of the conventional, permanently installed visor in the vehicle to sandwich the visor therebetween and secure the supplemental visor 10a or 10b to the original equipment visor VL or VR of the vehicle. The attachment mechanisms are preferably secured over the hinged attachment side or edge of the original visors, allowing the original visors VL and VR and the visors 10a and 10b to operate essentially independently of one another as desired, with the original visors VL and VR and visors 10a and 10b thus having substantially the same hinge line. Thus, the original visor VL or VR may be lowered with the visor 10a or 10b adjacent thereto, or the visor 10a or 10b may be lowered with the original visor VL or VR remaining retracted, or both visors may be placed in their uppermost, retracted positions as desired.

Figure 4:
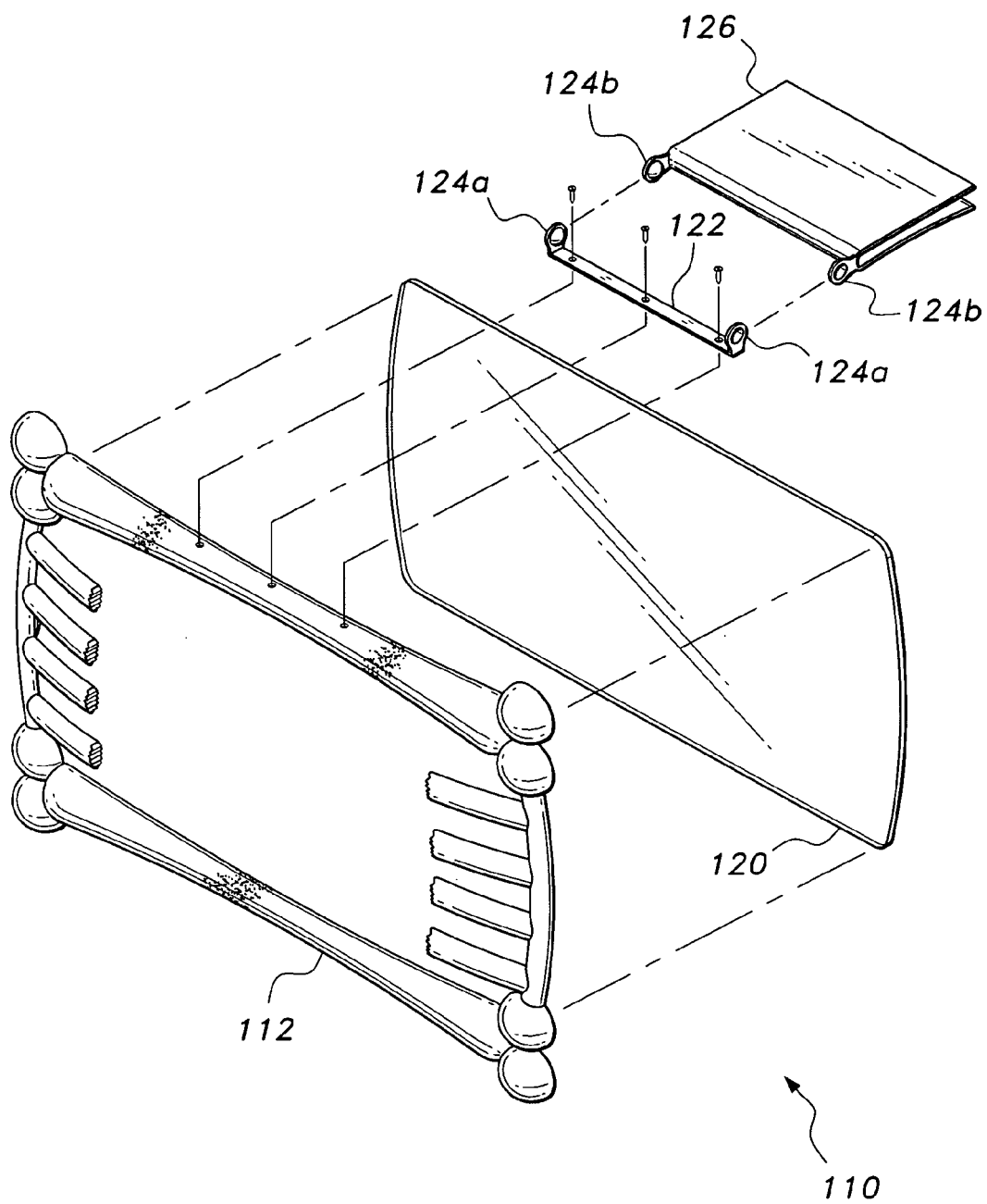
FIG. 4 is an exploded perspective view of a second embodiment sunglasses configuration sun visor panel, showing the hinge mechanism and other features.

FIG. 4 illustrates another embodiment of the sunglasses configuration car visor, designated as visor 110. The visor 110 includes a closed, continuous frame 112 including a forward lens retaining flange and a series of clips defining a channel between the flange and clips. The flange, clips and channel are not shown in FIG. 4, but are substantially similar to the configuration shown in FIG. 3 for the embodiment 10. The frame may take on any practicable configuration as desired, as noted further above. The frame 110 of FIG. 4 will be seen to have a configuration resembling a series of bones assembled to form a closed frame, with a series of rib-like bone segments extending inwardly from each lateral member. These relatively shorter segments may serve as the front retaining members for the lens panel 120, if so desired. The lens panel 120 is closely congruent with the retaining channel (not shown in FIG. 4) of the frame 112 and may have any desired optical properties, e.g. different tints or gradients, polarization, etc., as desired.

The visor attachment mechanism of the embodiment 110 differs from that of the embodiment 10. However, the two different attachment mechanisms may be used interchangeably with either embodiment, as desired. The attachment mechanism of the embodiment 110 of FIG. 4 includes a frame attachment component 122 generally comprising an elongate member having opposed upturned pivots 124a extending therefrom. A visor clip 126 comprises a pair of spaced apart leaves which sandwich the existing automobile sun visor therebetween to secure the visor 110 removably thereto. The visor clip 126 includes a pair of opposed pivots 124b, which grip the pivots 124a of the frame attachment component 122 frictionally therebetween to retain the supplemental visor assembly 110 in a raised, lowered, or intermediate position relative to the original equipment visor.

Figure 5:
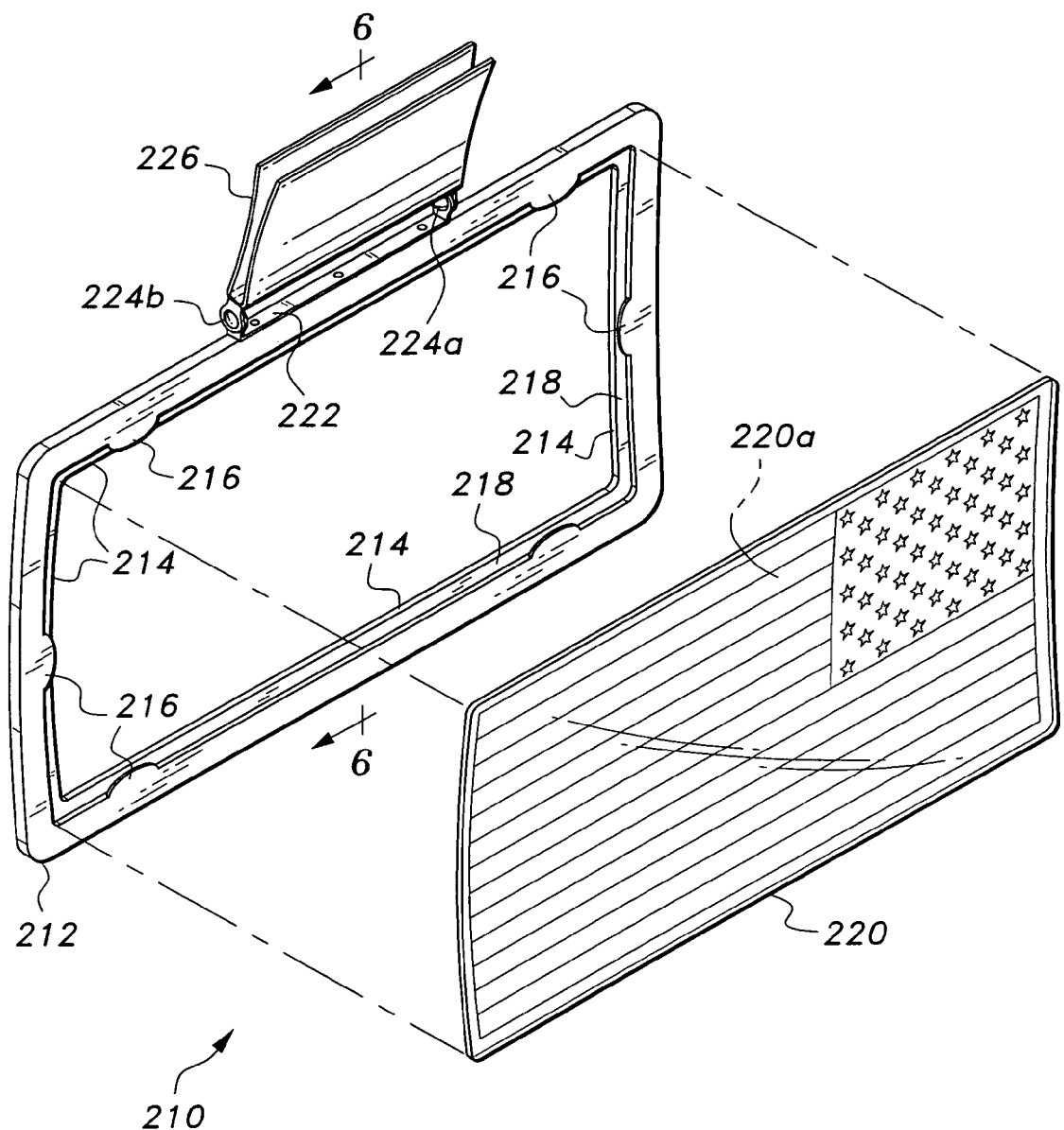
FIG. 5 is an exploded rear perspective view of another embodiment of the sunglasses configuration sun visor, showing the interchangeable lens panel system.
Figure 6:
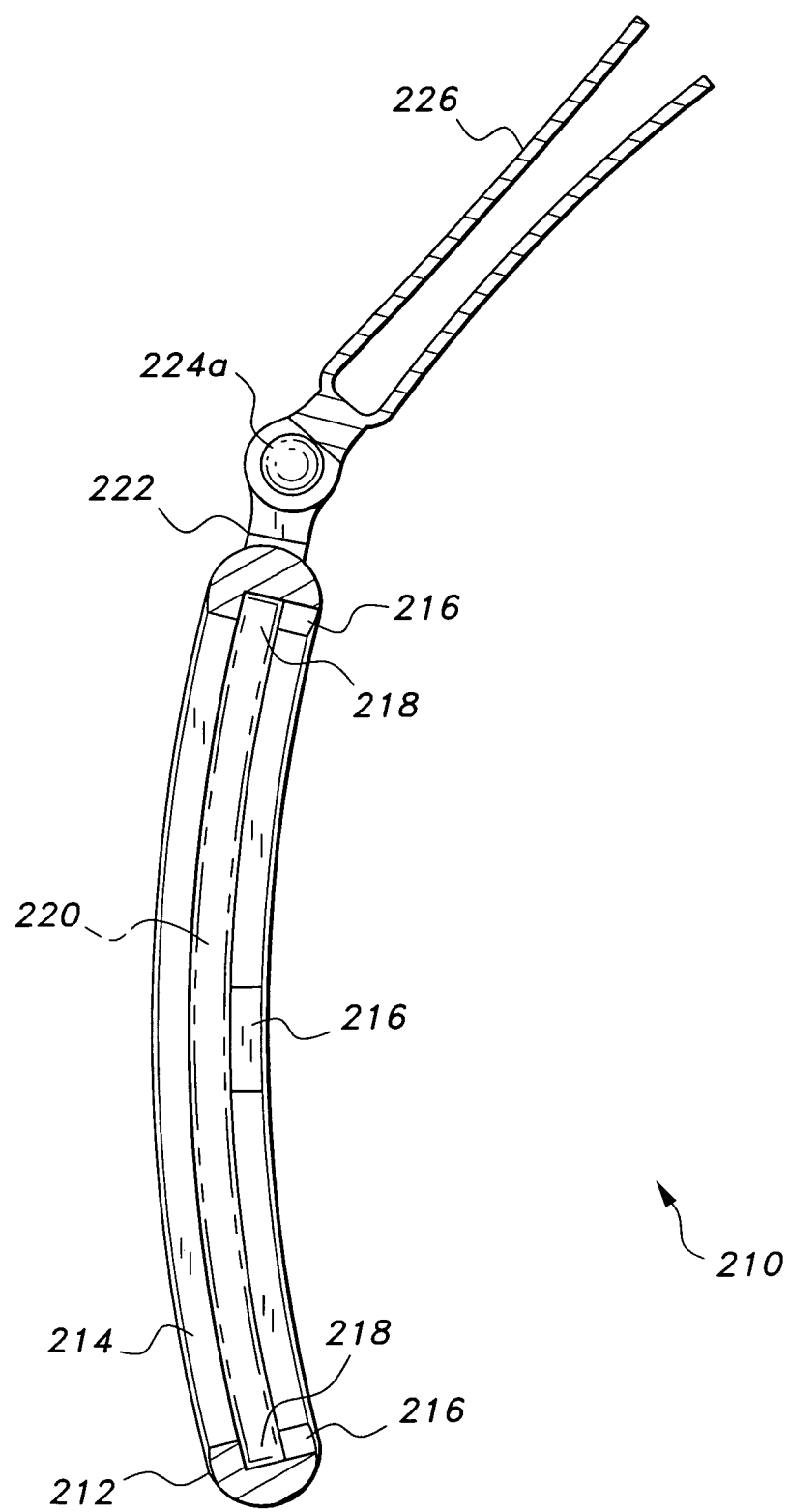
FIG. 6 is a side elevation view in section of the assembled embodiment of FIG. 5, showing the retention of the lens panel within the frame and other features.

FIGS. 5 and 6 illustrate yet another embodiment of the sunglasses configuration car visor, designated as visor 210. The visor 210 has a generally rectangular frame 212 including a forward lens retaining flange 214 and a series of rearwardly disposed lens retaining clips 216 defining a series of short lens retaining channels 218 therebetween. As in the other embodiments, the clips could be formed as a continuous flange to define a continuous peripheral channel with sufficient lens and frame flexibility.

The translucent lens panel 220 differs from the panels 20 and 120 of the other embodiments discussed further above. The panel 220 includes a "half silvered" front surface defining a pattern 220a (e.g., U.S. flag) thereon. It will be understood that the term "half silvered" refers to a conventional technique of applying a relatively light reflective coating to a transparent or translucent surface, causing the surface to be substantially reflective when viewed from a relatively lighter side while being translucent when viewed from a relatively darker side. Various techniques are known for providing such properties, and most such techniques permit the translucent coating to include some form of pattern, decorative design motif, or other visible element(s) thereon. The "half silvered" translucent lens panel 220 of FIG. 5 (shown in broken lines in the frame 212 of FIG. 6) may include one or more elements, e.g., the U.S. flag pattern 220a as illustrated, or any other flags or national symbols, landscapes, personalities, occupational or club membership logos, sports team names or logos, geometric or non-geometric figures, etc., as desired.

The visor 210 may be removably attached to the conventional or original equipment visor of a motor vehicle by means of a hinge or pivot clip assembly much like that of the embodiment of FIG. 4, comprising a frame attachment bracket or component 222 having a pair of opposed pivots 224a and a visor attachment clip 226 having a pair of pivots 224b which frictionally grip the frame bracket clips 224a therebetween. The clips 224a and 224b, as well as the clips 124a and 124b, could be configured oppositely to the above description, if so desired, i.e., the components 124b or 224b could be gripped between their counterparts 224a or 224b. Alternatively, the clip arrangement illustrated in FIGS. 1 through 3 could be applied to the embodiment 210 of FIGS. 5 and 6, or any other embodiment of the sunglasses configuration car visor.

In conclusion, the sunglasses configuration car visor provides a means of reducing solar glare, headlight glare from oncoming cars at night, and/or any other unwanted light, without blocking the view of the driver or passenger. The visor may be provided in mirror image pairs and removably clipped to the existing opaque visors in a motor vehicle in order to provide the appearance of a pair of sunglasses disposed within the windshield of the motor vehicle when both are lowered together. The visor may take on virtually any practicable form desired, just as in the case of conventional sunglasses worn upon the face of a user. Decorative motifs, advertising, sports and occupational names and logos, designs indicating certain interests or personality traits, etc., may be used in the frame configurations as desired. Alternatively, the frames may be formed to have a relatively unobtrusive configuration and covered or otherwise provided with material closely matching the existing visor and/or other interior materials of the vehicle, e.g., cloth, vinyl, leather, etc, as desired. The lens panels may also be treated in much the same manner by means of applying a translucent pattern or design to one surface thereof.

It is to be understood that the present invention is not limited to the embodiments described above, but encompasses any and all embodiments within the scope of the following claims.

I claim:

1. A car visor adaptor for use with a first vehicle sun visor and a second vehicle sun visor, each vehicle sun visor having a top edge pivotally attached to a vehicle ceiling, a bottom edge, and at least one side edge between the top and bottom edges, comprising:
   a first visor frame and a second visor frame, each said first and second visor frame defining a perimeter and having a plurality of panel retaining clips disposed therearound;
   wherein said first visor frame and said second visor frame are formed as sunglasses and are aesthetically decorative;
   a first translucent panel and a second translucent panel, each said first and second translucent panel being removably secured respectively within each said first and second visor frame by the retaining clips; and
   means for attaching said first visor frame and said second visor frame to a respective vehicle sun visor;
   wherein said means for attaching includes a pivotally disposed visor attachment clip extending from each said visor frame, said clip being coupled to the top edge of the sun visor of the vehicle; and said first translucent panel and said second translucent panel is half-silvered and includes a visual pattern thereon;
   whereby when said first visor frame and said second visor frame are in a lowered position, said first translucent panel and said second translucent panel appear as mirrors or visual patterns externally of a car.

2. The car visor adaptor according to claim 1, wherein each said first visor frame and said second visor frame has a closed periphery completely surrounding said first translucent panel and said second translucent panel when said first translucent panel and said second panel is respectively installed therein.

3. The car visor adaptor according to claim 1, wherein;
   said first visor frame and said second visor frame are a left side and a right side visor frame, are a mirror image of the other; and
   said first translucent panel and said second panel comprises at least one left side and at least one right side translucent panel removably secured respectively within said left side and said right side visor frame.

4. The car visor adaptor according to claim 1, wherein said first translucent panel and said second translucent panel comprises a plurality of translucent panels each having different optical properties from one another.

5. A sunglasses configuration car visor, comprising:
   at least one left side and at least one right side visor frame;
   whereby said visor frames are mirror images of each other, and are configured aesthetically to be in the form of sunglasses;
   a plurality of panel retaining clips disposed about each said left and right visor frames;
   attachment means for attaching said visor frames to a top edge of a respective vehicle sun visor, the top edge being mounted to the ceiling of a vehicle; and
   at least one left side and at least one right side translucent panel removably secured respectively within said left side and said right side visor frames,
   wherein each said at least one left translucent panel and said least one right translucent panel is half-silvered and includes a visual pattern thereon;
   whereby when said first visor frame and said second visor frame are in a lowered position, said first translucent panel and said second translucent panel appear as mirrors or visual patterns externally of the vehicle.

6. The sunglasses configuration car visor according to claim 5, said attachment means includes a pivotally disposed visor attachment clip extending from each said first visor frame and said second visor frame and clips onto the top edge of the respective vehicle sun visor.

7. The sunglasses configuration car visor according to claim 5, each said at least one left translucent panel and said least one right translucent panel includes a plurality of translucent panels each having different optical properties from one another.

* * * * *